United States Patent
Wendt et al.

(10) Patent No.: US 6,871,415 B2
(45) Date of Patent: Mar. 29, 2005

(54) CONTAINER PLUG GAUGE AND METHOD OF USE

(75) Inventors: Noel D. Wendt, Toledo, OH (US); Gregory A. Ritz, Berkey, OH (US); William R. Martin, Slippery Rock, PA (US); James S. Barnes, Maumee, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 10/631,207

(22) Filed: Jul. 31, 2003

(65) Prior Publication Data

US 2005/0022408 A1 Feb. 3, 2005

(51) Int. Cl.$^7$ .............................. G01B 3/56; G01B 3/46
(52) U.S. Cl. .......................................... 33/522; 33/542
(58) Field of Search .......................... 33/522, 542, 543, 33/501.45

(56) References Cited

U.S. PATENT DOCUMENTS

| 2,352,091 | A | 6/1944 | Fedorchak et al. |
| 2,596,342 | A | 5/1952 | McNutt et al. |
| 2,759,600 | A | 8/1956 | Saylor |
| 2,987,179 | A | 6/1961 | Allgeyer et al. |
| 3,012,665 | A | 12/1961 | Hanot et al. |
| 3,100,570 | A | 8/1963 | White |
| 3,268,074 | A | 8/1966 | Johnson |
| 3,387,704 | A | 6/1968 | Powers, Jr. |
| 3,407,931 | A | 10/1968 | Vincent |
| 3,422,542 | A | 1/1969 | Spurr |
| 3,464,547 | A | 9/1969 | Becker |
| 3,771,650 | A | 11/1973 | Henderson et al. |
| 3,815,248 | A | 6/1974 | Kulig |
| 3,863,349 | A | 2/1975 | Wilson |
| 3,914,872 | A | 10/1975 | Strzala |
| 3,921,303 | A | 11/1975 | Zappia |
| 4,008,525 | A | 2/1977 | Zappia |
| 4,044,892 | A | 8/1977 | Loos |
| 4,278,173 | A | 7/1981 | Pemberton et al. |
| 4,955,227 | A | 9/1990 | Fujita et al. |
| 5,189,808 | A | * 3/1993 | Evans et al. .................. 33/836 |
| 5,259,121 | A | * 11/1993 | Possati et al. ................ 33/542 |
| 5,313,847 | A | 5/1994 | Giometti |
| 5,388,707 | A | * 2/1995 | Stivison et al. ............... 33/522 |
| 5,761,820 | A | 6/1998 | Emery |
| 6,006,437 | A | 12/1999 | Cipriani |
| 6,510,751 | B2 | 1/2003 | Giometti |
| 6,536,294 | B1 | 3/2003 | Pemberton et al. |
| 6,581,751 | B1 | * 6/2003 | Nickey et al. .............. 198/379 |

FOREIGN PATENT DOCUMENTS

EP          0319180          7/1989

* cited by examiner

Primary Examiner—Christopher W. Fulton

(57) ABSTRACT

A plug gauge for testing the mouth of a container includes a spring carried by a support, a rod having one end coupled to the spring, and a gauge plug coupled to the other end of the rod. A control mechanism supports the rod and is coupled to an electric motor. Motion of the control mechanism by the motor lowers the rod and plug into the container mouth under force of the spring, and thereafter lifts the rod and plug out of the container mouth. In the preferred embodiment of the invention, the spring takes the form of an air spring. A stripper is operatively coupled to the control mechanism in the preferred embodiment of the invention for lowering against the container mouth, as the rod and plug are lowered by the spring and the motor, for holding the container mouth as the rod and plug are lifted from the container mouth. At least one sensor is coupled to the spring in the preferred embodiment of the invention, and is responsive to position of the end of the rod for determining penetration of the plug into the container mouth.

22 Claims, 6 Drawing Sheets

US 6,871,415 B2

CONTAINER PLUG GAUGE AND METHOD OF USE

The present application is directed to a plug gauge for inspecting the inside diameter of a container mouth, and more particularly to a plug gauge and method of use in which the gauge plug is urged by a spring into the container mouth.

BACKGROUND AND SUMMARY OF THE INVENTION

It is conventional practice to test the inside diameter of a container mouth by inserting a gauge plug into the container mouth. U.S. Pat. Nos. 2,596,342, 3,914,872 and 4,278,173 disclose plug gauges of this general type. U.S. Pat. No. 3,914,872 in particular discloses a dual-plug arrangement having a first plug for determining that the mouth inside diameter at least exceeds a minimum first diameter, and a second plug for determining that the mouth inside diameter does not exceed a maximum second diameter. In the prior art, the gauge plugs are mechanically inserted into the container mouth in such a way that the plug may cause jamming or breakage if the container mouth is choked, for example. A general object of the present invention is to provide a plug gauge and method of use for inspecting the inside diameter of a container mouth, in which the gauge plug is inserted into the container mouth in such a way as to minimize the likelihood of jamming or breakage at the container mouth.

A plug gauge for testing the mouth of a container in accordance with a presently preferred embodiment of the invention includes a spring carried by a support, a rod having one end coupled to the spring, and a gauge plug coupled to the other end of the rod. A control mechanism supports the rod and is coupled to an electric motor. Motion of the control mechanism by the motor lowers the rod and plug into the container mouth under force of the spring, and thereafter lifts the rod and plug out of the container mouth. In the preferred embodiment of the invention, the spring takes the form of an air spring. A stripper is operatively coupled to the control mechanism in the preferred embodiment of the invention for a lowering against the container mouth, as the rod and plug are lowered by the spring and the motor, for holding the container mouth as the rod and plug are lifted from the container mouth. At least one sensor is coupled to the spring in the preferred embodiment of the invention, and is responsive to position of the end of the rod for determining penetration of the plug into the container mouth.

BRIEF DESCRIPTION OF THE DRAWINGS

The invention, together with additional objects, features, advantages and aspects thereof, will be best understood from the following description, the appended claims and the accompanying drawings, in which:

FIG. 10 is a perspective view of the spring, rod and plug subassembly in accordance with the presently preferred embodiment of the invention.

DETAILED DESCRIPTION OF PREFERRED EMBODIMENTS

Figure 1:
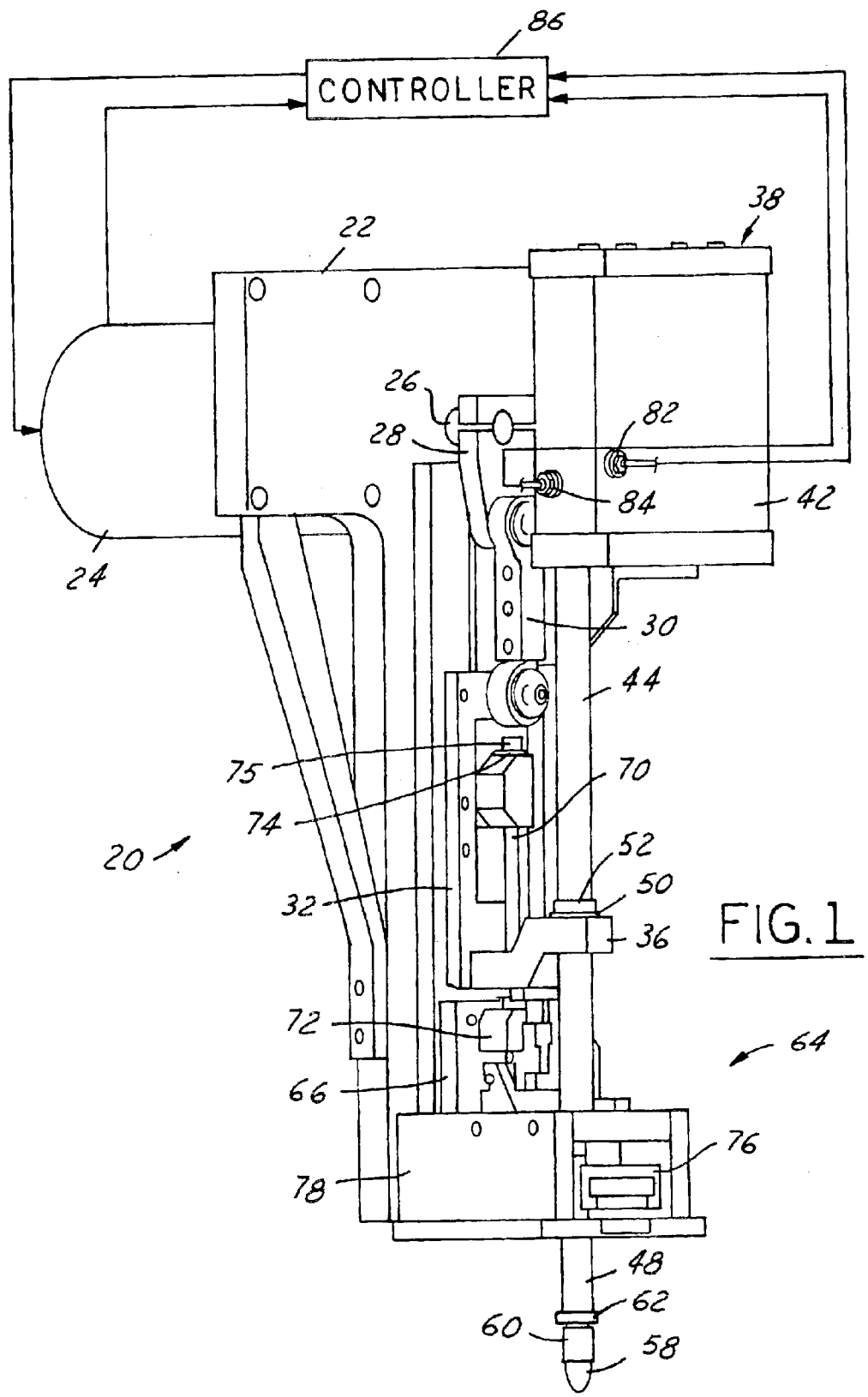
FIG. 1 is an elevational view of a plug gauge for testing the mouth of a container in accordance with a presently preferred embodiment of the invention.

FIG. 1 illustrates a plug gauge 20 in accordance with one presently preferred embodiment of the invention. Plug gauge 20 includes a support 22, in the form of a plate or bracket, for mounting the plug gauge above an inspection station for inspecting containers. The inspection station preferably receives containers in sequence from a conveyor (not shown). The conveyor may take the form of a starwheel conveyor of the type illustrated in U.S. Pat. No. 4,230,219, for example, or of the type illustrated in U.S. application Ser. No. 09/679,584 filed Oct. 4, 2000, now U.S. Pat. No. 6,581,751. The conveyor shown in the noted pending application, which is incorporated herein by reference, includes a frame to which support 22 can be mounted so that plug gauge 20 is secured in fixed position over an inspection station to which containers are brought by the conveyor for inspection. The invention is by no means limited to use in connection with circular-type conveyors, and can as well be implemented in connection with linear conveyors. The container preferably is held in fixed position beneath gauge 20 during the inspection operation. However, a less preferred arrangement would be to mount gauge 20 on a suitable movable frame so that the gauge can follow and inspect containers moving along a linear path, for example.

A motor 24 (FIGS. 1, 2 and 5), preferably a rotary electric servo motor, is mounted on support 22, and has an output shaft 26 that extends through the support. A crank arm 28 is mounted on shaft 26, and is coupled by a link arm 30 to a rod arm slide 32. Slide 32 is mounted to support 22 by means of a linear bearing for vertical linear motion beneath motor shaft 26. A rod arm 36 extends from the lower end of rod arm slide 32 outwardly away from support 22. A spring 38 is mounted to support 22 by means of a bracket 40 (FIG. 2) outwardly adjacent to link arm 30—i.e., on the side of link arm 30 remote from support 22. Spring 38 preferably takes the form of an air spring, which includes a housing or tank 42 in which air is captured under pressure. A vertical rod 44 has an upper end slidably disposed within spring housing 42, and a lower end spaced vertically downwardly from the spring housing. A seal 46 is carried by housing 42 surrounding rod 44 to prevent escape of air. A gauge plug 48 is mounted to the lower end of rod 44 coaxially with rod 44, which preferably is cylindrical in geometry. The mid portion of rod 44 slidably extends through a bearing 50 carried by rod arm 36. An annular bead or shoulder 52 encircles rod 44 and is disposed between spring housing 42 and arm 36 for cooperating with the upper surface of arm 36 to support rod 44 and plug 48, as will be described. Rod 44 is freely slidable in rod arm bearing 50.

Figure 8:
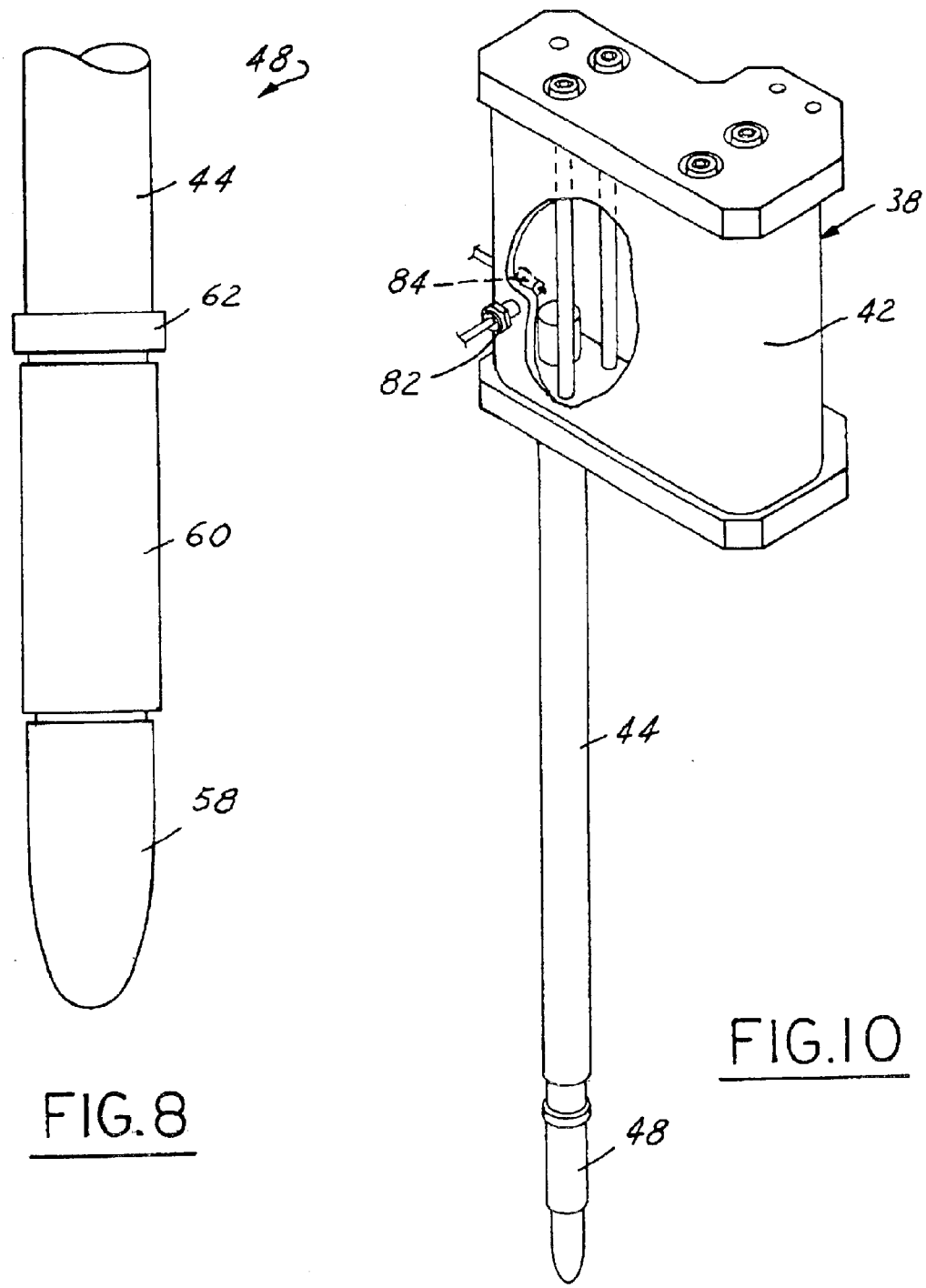
FIG. 8 is a fragmentary elevational view that illustrates the gauge plug in the preferred embodiment of the invention.

Gauge plug 48 includes an internally threaded bore 54 (FIG. 2) that is threaded over an externally threaded shank 56 on rod 44 to secure plug 48 to rod 44. FIG. 8 illustrates a presently preferred embodiment of gauge plug 48 as including a bullet-nose tip 58 for leading entry into the container mouth, a neck test portion 60 adjacent to tip 58 and of generally uniform diameter, and a cork test portion 62 of generally uniform diameter on a side of portion 60 remote from tip 58. Neck test portion 60 has a diameter adapted slidably to be received within the mouth of a container having a minimum desired internal diameter. Cork test portion 62 has a diameter adapted to be plugged—i.e., not to be received—within a container mouth of maximum allowable diameter. In other words, neck test portion 60 will be freely received within the container mouth as long as the inside diameter of the container mouth is not too small, and cork test portion 62 will not be received within the container mouth as long as the container mouth diameter is not too large. Plug 48, including tip 58 and portions 60, 62, may be of one-piece integral construction, or may be of multi-piece construction in situations in which allowable minimum and maximum inside diameters may change. Portions 60,62 preferably are substantially coaxial with tip 58.

Figure 5:
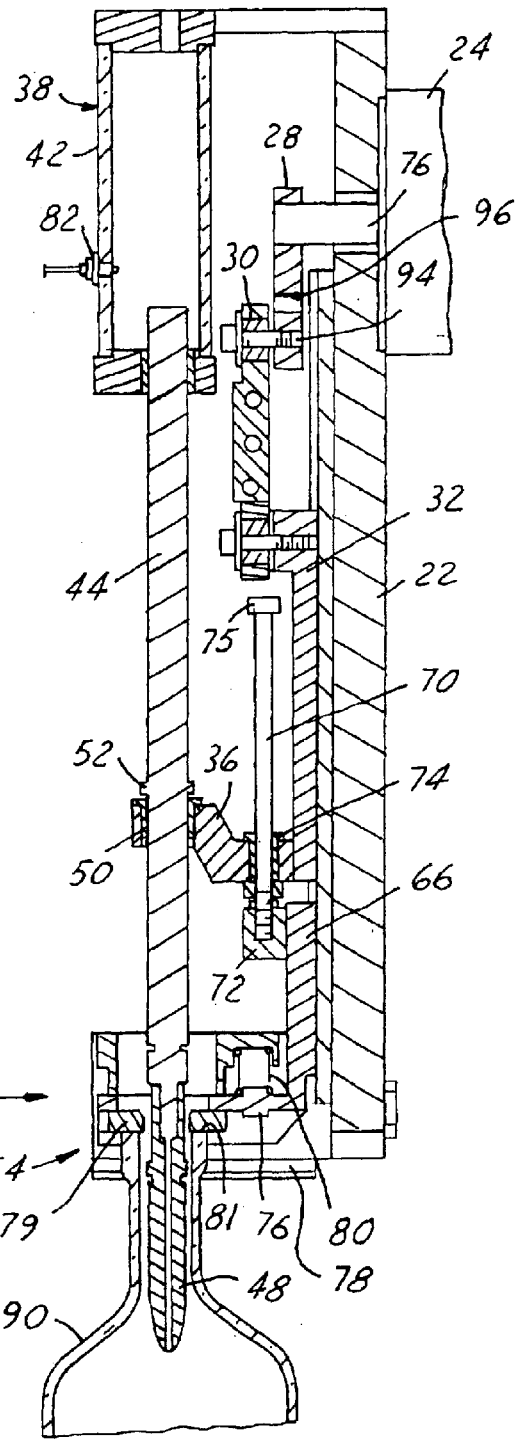
FIG. 5 is a fragmentary sectional view which is similar to that of FIG. 2 but shows the plug gauge in the fully lowered position.
Figures 6, 7:
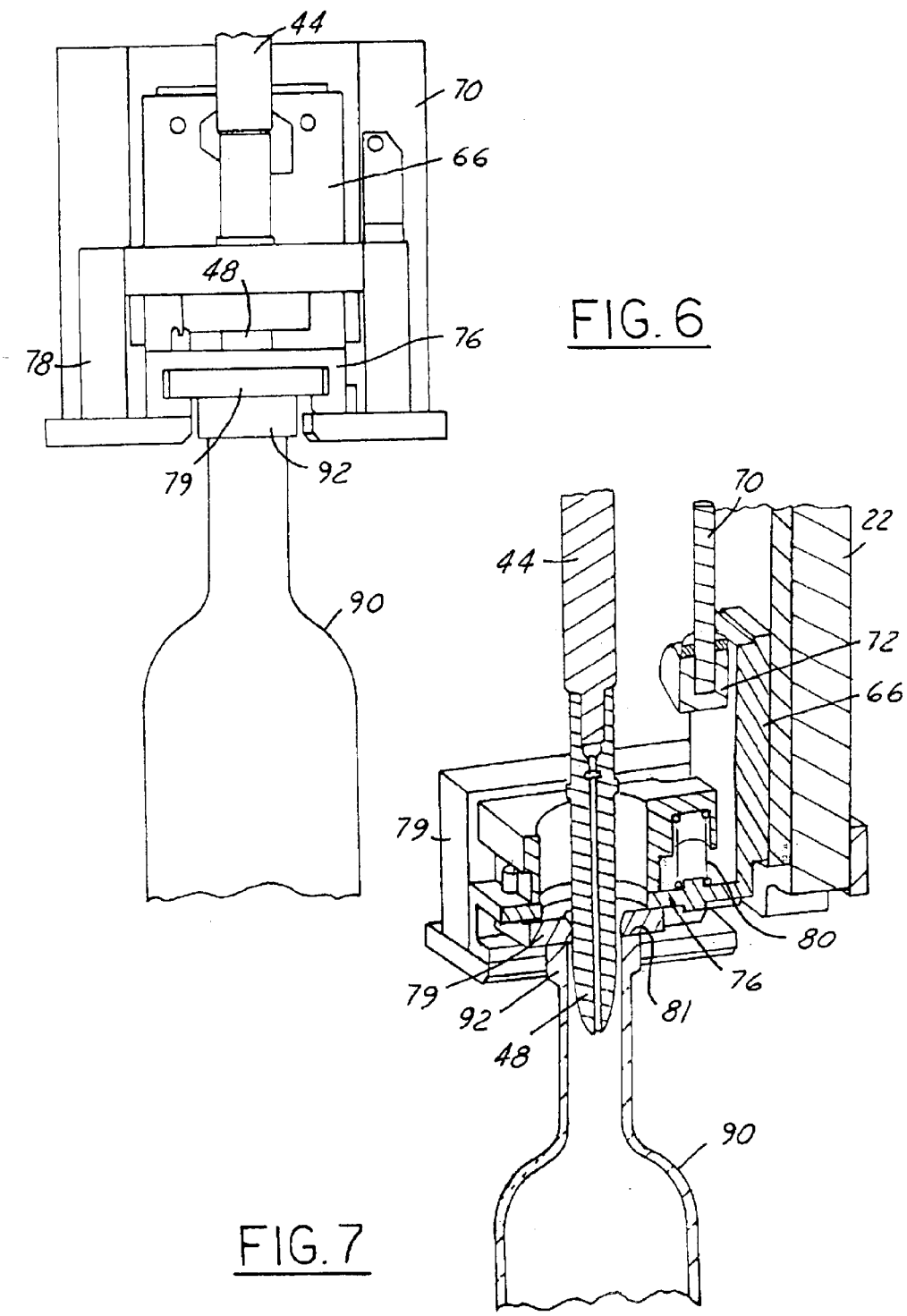
FIG. 6 is a fragmentary elevational view taken from the direction 6 in FIG. 5.
FIG. 7 is a fragmentary sectional view of the lower portion of the apparatus as illustrated in FIGS. 5 and 6.

A stripper 64 is mounted on support 22 and coupled to motor 24 for engaging the end of a container under inspection, and for holding the container in position as plug 48 enters and is withdrawn from the container mouth. Stripper 64 includes a stripper head or slide 66 mounted to support 22 by means of a linear bearing. Stripper slide 66 preferably is positioned beneath and moves colinearly with rod arm slide 32. A stripper rod 70 extends from a block 72 secured to stripper slide 66 through a bearing 74 in rod arm 36. A head 75 or other suitable enlargement is disposed on the upper end of rod 70. Stripper rod 70 provides a lost-motion coupling of stripper 64 to rod arm 36, as will be described. The lower portion 76 of stripper slide 66 forms a head that extends laterally away from support 22 beneath a stripper base 78 secured to the support. At least one coil spring 80 (FIGS. 2 and 5) is captured in compression within a pocket in stripper base 78 between stripper base 78 and the lower leg 76 of stripper slide 66. Stripper slide leg 76 carries a washer 79 for engagement (FIG. 5) with the upper end surface 81 of a container finish, as shown in FIGS. 5–7, when stripper 64 is in the fully lowered position.

A pair of position sensors 82, 84 are operatively coupled to rod 44, preferably by being disposed on spring housing 42 so as to be responsive to the position of the upper end of rod 44. Sensors 82, 84 provide input to a controller 86 (FIG. 1), which controls operation of servo motor 24 and receives feedback information indicative of operation of the servo motor. Controller 86 preferably is connected to a suitable information processor for processing information from plug gauge 20 and other inspection devices distributed around or along the conveyor, and for controlling generation of signals to reject containers that do not pass inspection, control operation of the conveyor, etc.

Figure 2:
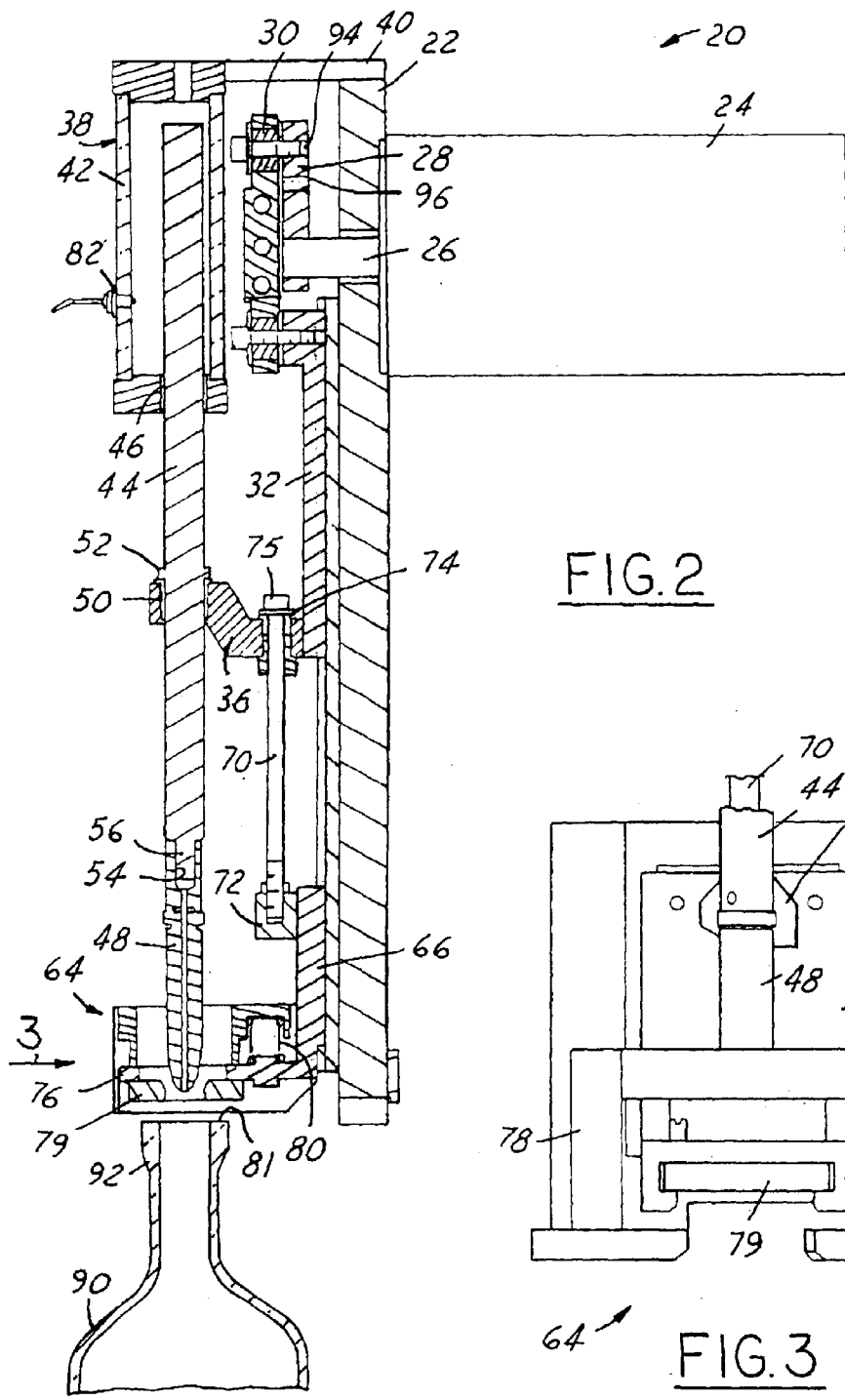
FIG. 2 is a sectional view that vertically bisects the apparatus of FIG. 1.
Figure 3:
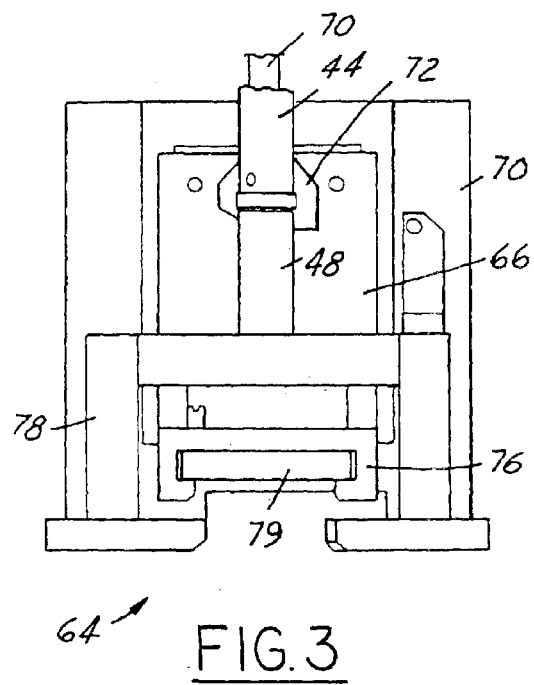
FIG. 3 is a fragmentary elevational view taken from the direction 3 in FIG. 2.
Figure 4:
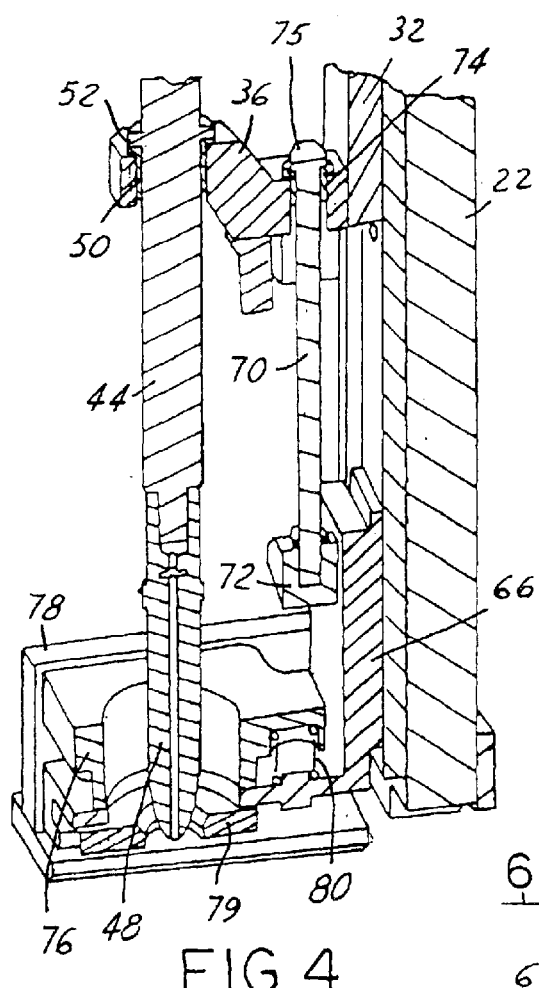
FIG. 4 is a fragmentary sectional view of the lower portion of the apparatus illustrated in FIGS. 1–3.

In operation, and with rod 44 and plug 48 in the fully raised positions illustrated in FIGS. 2–4, a container 90 is brought into position (FIG. 2) beneath plug gauge 20. Motor 24 is then activated by controller 86 (FIG. 1) to rotate shaft 26 and crank arm 28, and to push rod arm slide 32 by means of link arm 30 downwardly along support 22. As rod arm slide 32 and rod arm 36 descend, rod 44 and plug 48 are carried downwardly by rod arm 36 under the force of spring 38 acting on the upper end of rod 44 (as well as the force of gravity). Air spring 38 may have an internal pressure of 20 psi, operating on an end of rod 44 of 0.44 sq. in. Initial descent of rod arm slide 32 and rod arm 36 also allow stripper slide 66 and stripper rod 70 to descend and bring washer 80 on stripper slide 66 into engagement with upper end surface 81 of the container mouth 92. When stripper slide 66 and washer 80 engage container mouth 92, further downward motion of stripper slide 66 is prevented, so that stripper rod 70 does not follow further downward motion of rod arm 36. In the meantime, continued revolution of motor shaft 26 brings rod 44 and plug 48 to the fully lowered positions illustrated in FIGS. 1 and 5–7.

Figure 9:
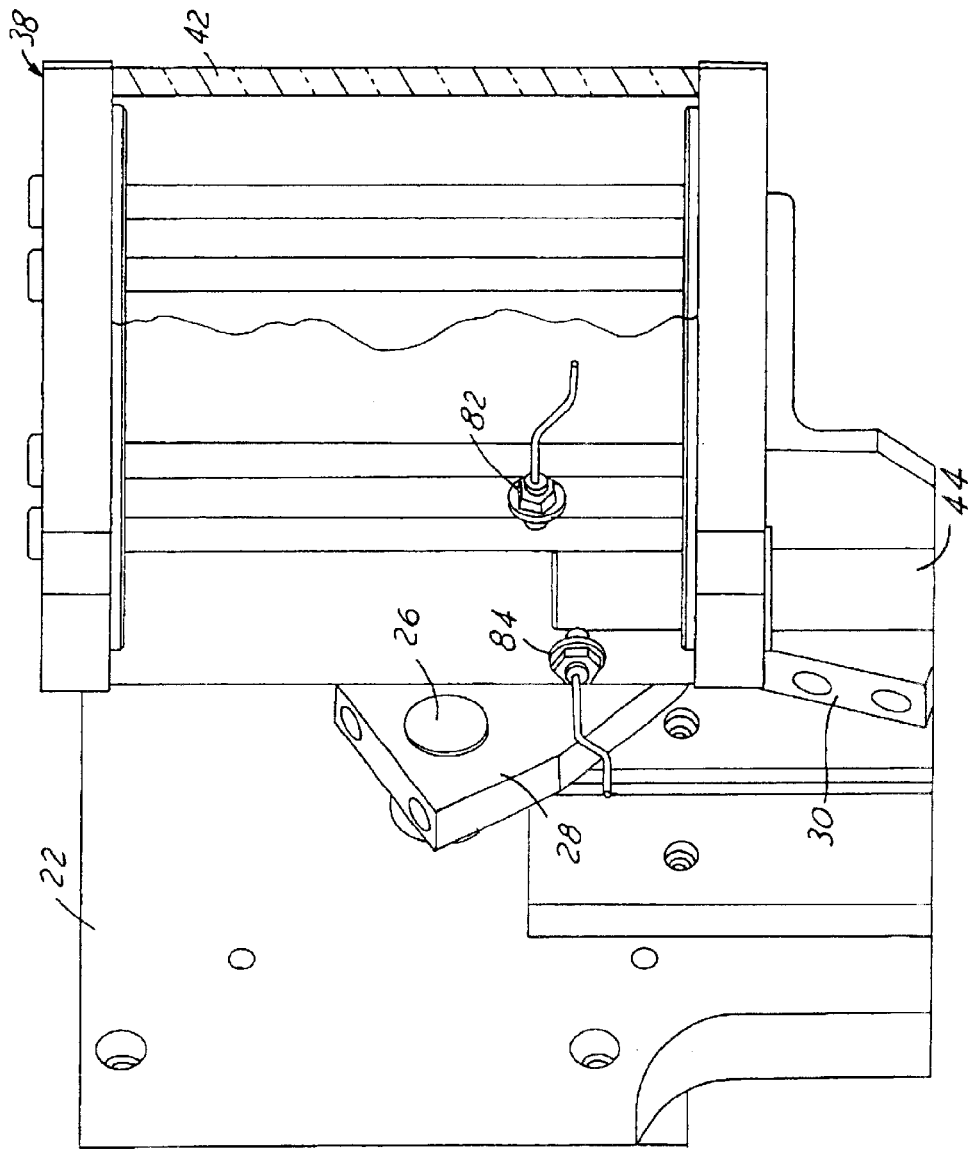
FIG. 9 is a fragmentary perspective view that illustrates the rod position sensors mounted on the rod spring in accordance with the presently preferred embodiment of the invention.

With stripper 64 in engagement with container mouth 92, further downward motion of rod 44 and plug 48, under the force of spring 38 and as carried by rod arm 36, moves plug 48 into container mouth 92. At the lowermost end of the stroke of rod 44 and plug 48, collar portion 62 (FIG. 8) of plug 48 should be engaged with the inside diameter of the container mouth. At this lowermost position of rod 44 and plug 48, the upper end of rod 44 has cleared sensor 82 (FIG. 9) but not cleared sensor 84. When controller 86 has determined that the rod and plug have been fully lowered, which is to say that crank arm 28 and link arm 30 are vertical as shown in FIG. 1, controller 86 scans sensors 82, 84 to determine the position of the upper end of the rod. If sensor 82 is uncovered by the upper end of the rod, this means that neck test portion 60 (FIG. 8) of plug 48 has fully penetrated the container mouth. At the same time, sensor 84 not being uncovered by the upper end of rod 44, as shown in FIG. 9, means that cork test portion 62 of plug 48 has not penetrated the container mouth. The container is therefore deemed to have passed the plug gauge test. If sensor 82 is not uncovered, this means that the inside diameter of the container mouth is too small to admit neck test portion 60 of plug 48. If sensor 84 is uncovered by the upper end of the rod, this means that the inside diameter of the container mouth is too great to prevent entry of cork test portion 62 of plug 48.

Motor 24 and shaft 26 are then rotated, from the fully lowered position of FIGS. 1 and 5–9 toward the fully raised position of FIGS. 2–4. When rod arm 36 is brought into abutment with rod bead 52, upward motion of arm 36 and slide 32 lift rod 44 and plug 48 out of the container mouth. In the meantime, lost motion between rod 70 and arm 36 (FIG. 5) maintains stripper head portion 76 and washer 80 in engagement with container mouth 92 (FIG. 5), under the force of coil spring(s) 80. This holds the container mouth in position so that the plug can be extracted even if somewhat stuck within the container mouth. Continued upward motion of arm 36 and rod 44 eventually brings arm 36 into engagement with the enlarged head 75 of slide rod 70. Further upward motion of arm 36 and slide 32 lift stripper head 66 away from container mouth 92, so that the container can then be moved out of position and a new container brought to position beneath plug gauge 20 for testing. The stroke of rod 44 and plug 48 preferably can be adjusted by selective connection of link arm 38 to crank arm 28 in either of the two (or more) openings 94, 96 (FIG. 2).

There have thus been disclosed a plug gauge and method of use for testing the mouth of a container, which fully satisfy all of the objects and aims previously set forth. The invention has been disclosed in conjunction with one presently preferred embodiment thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

What is claimed is:

1. A plug gauge for testing the mouth of a container, which includes:
   a spring carried by a support,
   a rod having one end coupled to said spring and an other end,
   a plug coupled to said other end of said rod,
   an electric motor, and
   a control mechanism coupled to said motor and supporting said rod,
   motion of said control mechanism by said motor lowering said rod and plug into a container mouth under force of said spring and thereafter lifting said rod and plug out of the container mouth.

2. The plug gauge set forth in claim 1 wherein said control mechanism includes:
   a rod arm slide on said support,
   a crank arm coupling said motor, mounted on said support, to said rod arm slide, and
   a rod arm carried by said rod arm slide and slidably engaging said rod.

3. The plug gauge set forth in claim 2 wherein said rod has a stop for engaging said arm, said rod arm supporting said rod and said plug by engagement with said stop and being movable away from said stop, by said rod arm slide, said crank arm and said motor, when said plug engages a container mouth.

4. The plug gauge set forth in claim 2 wherein said crank mechanism includes a link arm coupling said crank arm to said rod arm slide, said link arm being movably connectable to said crank arm for varying stroke of said rod and said plug.

5. The plug gauge set forth in claim 1 further including a stripper operatively coupled to said control mechanism for lowering against the container mouth, as said rod and plug are lowered by said spring and said motor, and for holding the container mouth as said rod and plug are lifted from the container mouth.

6. The plug gauge set forth in claim 5 wherein said stripper includes a stripper slide carried by said support and a lost-motion coupling between said stripper slide and said rod arm slide.

7. The plug gauge set forth in claim 6 wherein said stripper includes:
   a stripper base carried by said support,
   a stripper head coupled to said stripper slide, and
   a stripper spring captured between said stripper base and said stripper head for urging said stripper head into engagement with a container mouth when said stripper slide is lowered into a container mouth by said lost motion coupling between said stripper slide and said rod arm slide.

8. The plug gauge set forth in claim 6 wherein said lost motion coupling includes a stripper rod extending from said stripper slide through an opening in said rod arm, and a stop on said stripper rod, such that said stripper slide is carried by said rod arm, through said stripper rod, during initial downward motion of said crank mechanism and said rod arm slide and during terminal upward motion of said crank mechanism and said rod arm slide, but is otherwise free floating with respect to said rod arm slide.

9. The plug gauge set forth in claim 1 further including at least one sensor coupled to said spring and responsive to said one end of said rod for determining penetration of said plug into the container mouth.

10. The plug gauge set forth in claim 9 wherein said plug has a first neck test portion adjacent to an end of said plug and a second cork test portion spaced from said end of said plug, and wherein said at least one sensor is responsive to said one end of said rod to determine that said neck test portion of said plug has penetrated the container mouth and that said cork test portion of said plug has not penetrated the container mouth.

11. The plug seal set forth in claim 10 wherein said motor comprises a rotary servo motor, and wherein said gauge includes control electronics coupled to said motor for scanning said at least one sensor when said rotary servo motor has fully lowered said plug toward the container.

12. The plug gauge set forth in claim 1 wherein said spring is an air spring.

13. A plug gauge for testing the mouth of a container, which includes:
   a support for mounting above a container inspection station,
   an air spring carried by said support,
   a rod having one end coupled to said air spring and an other end,
   a plug coupled to said other end of said rod as a coaxial extension of said rod,
   a rotary electric motor mounted on said support,
   a rod arm slide carried on said support beneath said motor,
   a crank arm coupling said motor to said rod arm slide,
   a rod arm carried by said rod arm slide,
   a stop on said rod for engaging said rod arm slide such that said rod arm supports said rod and said plug by engagement with said stop and being movable away from said stop when said plug engages a container mouth,
   a stripper mounted on said support beneath said rod arm slide and operatively coupled to said rod arm slide for lowering against a container mouth to hold the container in position as said rod and plug are lifted from the container mouth, and
   at least one sensor responsive to said rod for determining penetration of said plug into the container mouth.

14. The plug gauge set forth in claim 13 including a link arm coupling said crank ar to said rod arm side said link arm being movably connectable to said crank arm for varying stroke of said rod and said plug.

15. The plug gauge set forth in claim 13 wherein said stripper includes a stripper slide carried by said support and a lost-motion coupling between said stripper slide and said rod arm slide.

16. The plug gauge set forth in claim 15 wherein said stripper includes:
   a stripper base carried by said support,
   a stripper head coupled to said stripper slide, and
   a stripper spring captured between said stripper base and said stripper head for urging said stripper head into engagement with a container mouth when said stripper slide is lowered into a container mouth by said lost motion coupling between said stripper slide and said rod arm slide.

17. The plug gauge set forth in claim 16 wherein said lost motion coupling includes a stripper rod extending from said stripper slide through an opening in said rod arm, and a stop on said stripper rod, such that said stripper slide is carried by said rod arm, through said stripper rod, during initial downward motion of said crank mechanism and said rod arm slide and during terminal upward motion of said crank mechanism and said rod arm slide, but is otherwise free floating with respect to said rod arm slide.

18. The plug gauge set forth in claim 13 wherein said plug has a first neck test portion adjacent to an end of said plug and a second cork test portion spaced from said end of said plug, and wherein said at least one sensor is responsive to said one end of said rod to determine that said neck test portion of said plug has penetrated the container mouth and that said cork test portion of said plug has not penetrated the container mouth.

19. The plug gauge set forth in claim 18 wherein said at least one sensor includes first and second sensors coupled to said air spring and responsive to position of said one end of said rod.

20. The plug gauge set forth in claim 19 wherein said motor comprises a rotary servo motor, and wherein said gauge includes control electronics coupled to said motor for scanning said at least one sensor when said rotary servo motor has fully lowered said plug toward the container.

21. A method of inspecting the inside diameter of a container mouth that includes the steps of:

(a) providing a plug coupled by a rod to an air spring, and a motor coupled to the rod by a rod arm, (b) operating the motor to lower the rod arm such that the plug enters a container mouth under force of the air spring, (c) determining a diameter characteristic of the container mouth as a function of penetration of the plug into the container mouth in said step (b), and then (d) operating the motor to lift the rod arm and plug out of the container mouth.

22. The method set forth in claim 21 including the steps of:

(e) during said step (b), lowering a stripper into engagement with the container mouth to hold the container mouth in position during said step (d), and (f) lifting the stripper out of engagement with the container mouth after the plug has cleared the container mouth in said step (d).

* * * * *